(12) United States Patent
Wang et al.

(10) Patent No.: US 9,316,866 B2
(45) Date of Patent: Apr. 19, 2016

(54) ARRAY SUBSTRATE, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yongcan Wang, Beijing (CN); Hongming Zhan, Beijing (CN); Lifeng Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/501,147

(22) Filed: Sep. 30, 2014

(65) Prior Publication Data

US 2015/0362765 A1 Dec. 17, 2015

(30) Foreign Application Priority Data

Jun. 17, 2014 (CN) .......................... 2014 1 0270340

(51) Int. Cl.
*G02F 1/1337* (2006.01)
*G02F 1/1333* (2006.01)
(52) U.S. Cl.
CPC ............ *G02F 1/1337* (2013.01); *G02F 1/1333* (2013.01); *G02F 2001/133302* (2013.01); *G02F 2001/133388* (2013.01); *Y10T 428/24322* (2015.01)

(58) Field of Classification Search
CPC ................... H01L 2924/0002; H01L 2924/00; H01L 29/7869; H01L 27/3244; H01L 51/0022
See application file for complete search history.

(56) References Cited

U.S. PATENT DOCUMENTS 6,414,733 B1 * 7/2002 Ishikawa et al. .............. 349/110
2011/0063561 A1 3/2011 Song et al.

FOREIGN PATENT DOCUMENTS

CN 102654667 A 9/2012

* cited by examiner

*Primary Examiner* — Tony Tran
(74) *Attorney, Agent, or Firm* — Harness, Dickey & Pierce, P.L.C.

(57) ABSTRACT

The present invention discloses an array substrate, a display panel and a display device. A planarization layer is covered on the array substrate, forms a planar plane on the array substrate and an orientation film is set on the planarization layer, the planarization layer extends to a non-display area of the array substrate, and the thickness thereof in the position where a via hole is formed in the non-display area on the array substrate is not less than the depth of the via hole. The present invention has the following beneficial effects: avoiding that an orientation solution is influenced by the via hole during formation of an orientation layer, thus the orientation solution disperses uniformly, the problem that defects occur on the periphery of the orientation film is well alleviated, the formation effect of the orientation film is improved, thereby the display effect of the display device is improved.

4 Claims, 2 Drawing Sheets

ARRAY SUBSTRATE, DISPLAY PANEL AND DISPLAY DEVICE

CROSS REFERENCE TO RELATED APPLICATION

This application claims priority to Chinese Patent Application No. 201410270340.6 filed on Jun. 17, 2014, the disclosures of which are incorporated in their entirety by reference herein.

TECHNICAL FIELD

The present invention relates to the technical field of display devices, and in particular, to an array substrate, a display panel and a display device.

BACKGROUND

In the current Cell process, PI Inkjet coating has the features that no APR plate is needed (which is used in the process of the existing glass substrate which is small), the speed of PI Coating high and the production capacity is high; however, it is difficult to control the uniformity of PI Coating, especially on the periphery of the cell, and defects are mainly centralized on an array substrate (the dispersal uniformity of the PI liquid in contact with a metal is not as good as the dispersal uniformity of PI liquid on an organic film, therefore the defects of PI coating are mainly centralized on the array substrate, other than on the color filter substrate), thus PI Coating-related defects tend to occur. As shown in FIG. 1, an array substrate 1 and a color filter substrate 2 are encapsulated via a sealant 3, an orientation layer 4 is formed on the array substrate 1 by an orientation solution, and since a metal layer is arranged on a non-display area on the periphery of the array substrate 1, via holes are formed and the density of the via holes is larger than that of a display area, the orientation solution disperses non-uniformly on the periphery of the array substrate, and the defects becomes more serious. How to overcome the above defects becomes an urgent problem in the process of an orientation film.

SUMMARY

The present invention provides an array substrate, a display panel and a display device, which are used for improving the coating effect of the orientation film on the array substrate, thereby improving the display effect of the display device.

In one embodiment, the present invention provides an array substrate, which comprises a planarization layer covered on the array substrate, the planarization layer forms a planar plane on the array substrate and an orientation film is set on the planarization layer, wherein the planarization layer extends to a non-display area of the array substrate, and the thickness of the planarization layer in a position where a via hole is formed in the non-display area of the array substrate is not less than the depth of the via hole.

In the above technical solution, a metal wire and the via hole located on a non-display area of an array substrate are shielded by the planarization layer, so that the upper surface of the array substrate will be a planar plane, and it will be avoided that an orientation solution is influenced by the via hole during formation of an orientation layer, thus the orientation solution will disperse uniformly, and the problem that defects occur on the periphery of the orientation film formed will be well alleviated, the formation effect of the orientation film will be improved, thereby the display effect of the display device will be improved.

In one embodiment, the planarization layer is a planarization layer in a shape of a frame, and the planarization layer in the shape of the frame is set on the non-display area of the array substrate, and the inner dimensions of the frame of the planarization layer are the same as the dimensions of a display area of the array substrate. By employing the planarization layer in the shape of the frame, it may be avoided that the response time of liquid crystal in an assembled display device is influenced by the planarization layer.

In one embodiment, the planarization layer is a resin layer. Thus, the orientation solution can be dispersed uniformly on the planarization layer, and the effect of the orientation layer formed can be improved.

In one embodiment, the resin layer comprises black resin or transparent resin. The planarization layer may comprise different resin materials.

In one embodiment, the resin layer comprises a dipentaerythritol pentaacrylate/dipentaerythritol hexaacrylate material.

In one embodiment, the thickness of the planarization layer is not less than 0.9 μm, which guarantees that the via hole can be shielded by the planarization layer.

In one embodiment, the thickness of the planarization layer is between 0.9 and 1.0 μm, which not only improves the effect of the orientation film formed, but also avoids that the thickness of the array substrate is influenced by a planarization layer which is too thick.

The present invention further provides a display panel, which comprises any of the above array substrates.

In the above technical solution, a metal wire and a via hole located on a non-display area of an array substrate are shielded by a planarization layer, so that the upper surface of the array substrate will be a planar plane, and it will be avoided that an orientation solution is influenced by the via hole during formation of an orientation layer, thus the orientation solution will disperse uniformly, and the problem that defects occur on the periphery of the orientation film formed will be well alleviated, the formation effect of the orientation film will be improved, thereby the display effect of the display device will be improved.

The present invention further provides a display device, which comprises the above display panel.

In the above technical solutions, a metal wire and a via hole located on a non-display area of an array substrate are shielded by a planarization layer, so that the upper surface of the array substrate will be a planar plane, and it will be avoided that an orientation solution is influenced by the via hole during formation of an orientation layer, thus the orientation solution will disperse uniformly, and the problem that defects occur on the periphery of the orientation film formed will be well alleviated, the formation effect of the orientation film will be improved, thereby the display effect of the display device will be improved.

REFERENCE NUMBERS

1: Array Substrate
2: Color Filter Substrate

3: Sealant
4: Orientation layer
10: Array Substrate
11: Via Hole
20: Planarization Layer
30: Orientation film

DETAILED DESCRIPTION

In order to improve the coating effect of the orientation film of an array substrate and thereby to improve the display effect of a display device, the embodiments of the present invention provides an array substrate, a display panel and a display device; in the technical solutions of the embodiments of the present invention, by coating a planarization layer on a peripheral region of an array substrate, the coating of an orientation film is facilitated, and the orientation film may volatilize uniformly to form a planar orientation layer, thus the coating effect of the orientation film will be improved, thereby the display effect of the display device will be improved. In order to make the objects, technical solutions and advantages of the present invention more apparent, the present invention will be further illustrated in detail below by nonrestrictive embodiments.

Figure 1:
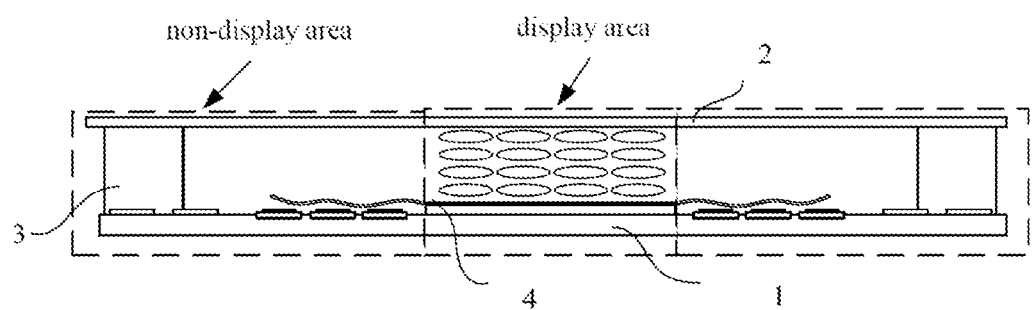
FIG. 1 is a schematic diagram of the structure of a display panel according to the prior art.
Figure 2:
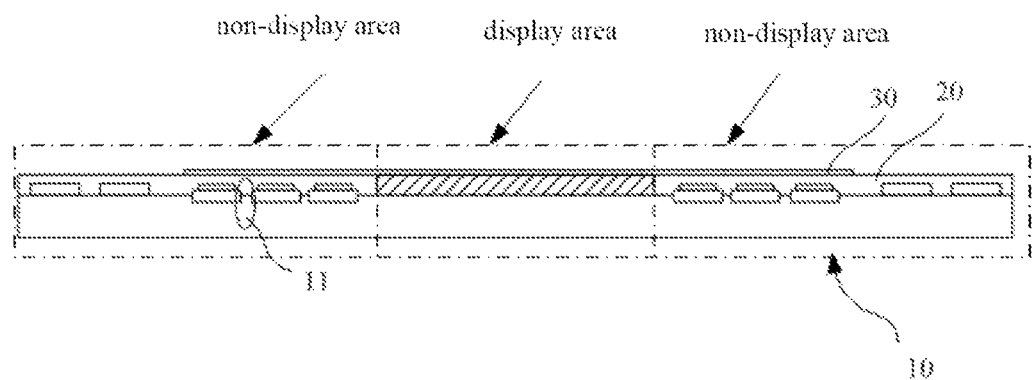
FIG. 2 is a front view of an array substrate according to one embodiment of the present invention.

As shown in FIG. 2, it shows a schematic diagram of the structure of an array substrate 10 according to one embodiment of the present invention.

This embodiment of the present invention provides an array substrate 10, which comprises a planarization layer 20 covered on the array substrate 10, the planarization layer 20 forms a planar plane on the array substrate 10, and an orientation film 30 is set on the planarization layer 20, wherein the planarization layer 20 extends to a non-display area of the array substrate 10, and the thickness of the planarization layer 20 in a position where a via hole 11 is formed in the non-display area of the array substrate 10 is not less than the depth of the via hole 11.

In the above embodiment, the planarization layer 20 is employed to shield the metal wire and the via hole 11 that are located on the non-display area of the array substrate 10, so that the upper surface of the array substrate 10 (which takes the positioned direction of the array substrate 10 in FIG. 2 as the reference direction) will be a planar plane, and it may be avoided that the orientation solution is influenced by the via hole 11 during formation of an orientation layer, thus the orientation solution will disperse uniformly, the problem that defects occur on the periphery of the orientation film 30 formed will be alleviated, and the formation effect of the orientation film 30 will be improved, thereby the display effect of the display device will be improved.

Figure 3:
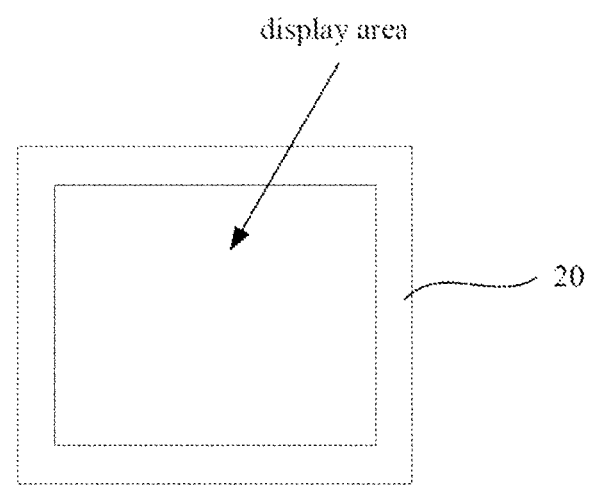
FIG. 3 is a top view of the array substrate according to the embodiment of the present invention.

Specifically, the whole array substrate 10 may be covered by the planarization layer 20, or only the non-display area on the array substrate 10 may be covered by employing a planarization layer 20 in a shape of a frame. In case that the whole array substrate 10 is covered by the planarization layer 20, the planarization layer 20 on the display area of the array substrate 10 should comprise a transparent material, so that light beams can pass through. By employing a planarization layer 20 with such a structure, the processing of a planarization layer 20 will be facilitated; however, coating the whole array substrate 10 with the planarization layer 20 will enlarge the distance between the liquid crystal layer and the metal electrode, for example, if the thickness of the planarization layer 20 is 1.0 µm, the gap between the metal electrode and the liquid crystal will be increased by about 1 µm, which causes that Vop is increased by about 1V, and the response time of the liquid crystal is increased by about 1 time of the former response time. Therefore, a planarization layer 20 in the shape of the frame is preferably employed; as shown in FIG. 3, a planarization layer 20 in the shape of the frame is set on the non-display area of the array substrate 10, and the inner dimensions of the frame of the planarization layer 20 are the same as the dimensions of the display area of the array substrate 10, thus the planarization layer 20 added will not influence the response time of the liquid crystal, and it may be avoided that other performances of the display device are influenced.

In one embodiment, the planarization layer 20 is a resin layer. The thickness of the resin layer needs to be larger than the thickness 0.9 µm of the metal of the via hole 11, and it will be thick enough when the metal are covered to be planar (relative to glass, rather than the metal layer), so that dispersal nonuniformity will not occur, and since the orientation solution has a small contact angle on the surface of the resin layer (the factors which influences the contact angle includes surface roughness, impurity component and element on the surface, since the peripheral surface of the existing array substrate 10 without a resin layer includes metal of the via hole 11 and glass, the surface is rough, and the metal elements contained are adverse to the dispersion of the orientation film 30, the contact angle is large, and the surface wettability is poor), it has a small wettability on the resin surface, and the dispersal uniformity is good; since the orientation solution disperses uniformly on the display area and the non-display area of the array substrate 10, the thickness of the films formed in the two areas will be consistent with each other.

In one embodiment, when a resin material is to be selected to manufacture the planarization layer 20, black resin may be selected, or transparent resin may be selected; that is, the resin layer may be a resin layer comprising black resin or transparent resin. Various resin materials could be selected, and in case that the planarization layer in the shape of the frame is employed and only the non-display area on the array substrate is covered by the planarization layer, there is no need to consider whether the pixel display area is influenced by the resin material selected (the material is only coated on the area except the non-display area, thus there is no need to consider the color of the material), if the whole layer is coated with the resin, only a highly transparent material can be selected; further, when a resin is selected, a black material such as BM may also be selected to further alleviate the problem of peripheral light leakage, or a resin material which is the same as that of a planar protective layer, a coloring layer or a black matrix layer of the display panel may be selected to form a planarization layer 20 on the array substrate 10. In one embodiment, in the manufacturing process, the material may be coated on a substrate according to a conventional manufacturing and exposing method of a color filter layer (which includes a coloring layer and a black matrix layer), and the display area is etched off by exposing and developing, or these resin materials are directly coated on the non-display area by Inkjet coating. In one embodiment, the resin layer comprises a dipentaerythritol pentaacrylate/dipentaerythritol hexaacrylate material.

In the above embodiment, in order to guarantee that the upper surface of the planarization layer 20 formed is a planar plane, the thickness of the planarization layer 20 is not less than 0.9 µm, so that the planarization layer 20 can fully fill the via hole 11 of the non-display area of the array substrate 10. In order to guarantee that not only the planarization layer 20 formed can meet the above requirements, but also avoid that the thickness of the array substrate 10 is influenced by the planarization layer 20 which is too thick, in one embodiment, the thickness of the planarization layer 20 is between 0.9 and 1.0 μm. Therefore, not only the object of shielding the via hole 11 may be attained, but also it may be avoided that the thickness of the array substrate 10 is influenced by the planarization layer 20 which is too thick; moreover, the raw materials for production may be saved.

In one embodiment, the present invention further provides a display panel, which includes any of the above array substrates 10.

The display panel according to this embodiment employs the array substrate 10 provided in the above embodiment, wherein a planarization layer 20 is employed to shield the metal wire and the via hole 11 that are located on the non-display area of the array substrate 10, so that the upper surface of the array substrate 10 (which takes the positioned direction of the array substrate 10 in FIG. 2 as the reference direction) will be a planar plane, and it may be avoided that the orientation solution is influenced by the via hole 11 during formation of an orientation layer, thus the orientation solution will disperse uniformly, the problem that defects occur on the periphery of the orientation film 30 formed will be alleviated, and the formation effect of the orientation film 30 will be improved, thereby the display effect of the display device will be improved.

In one embodiment, the present invention further provides a display device, which includes the above display panel.

The display device according to this embodiment employs the display panel provided in the above embodiment, and the display panel has all the characteristics of the array substrate 10 described in the above embodiments. A planarization layer 20 is employed to shield the metal wire and the via hole 11 that are located on the non-display area of the array substrate 10, so that the upper surface of the array substrate 10 (which takes the positioned direction of the array substrate 10 in FIG. 2 as the reference direction) will be a planar plane, and it may be avoided that the orientation solution is influenced by the via hole 11 during formation of an orientation layer, thus the orientation solution will disperse uniformly, the problem that defects occur on the periphery of the orientation film 30 formed will be alleviated, and the formation effect of the orientation film 30 will be improved, thereby the display effect of the display device will be improved.

Further, the display device may be any product or component that has a display function, for example, a display panel, an electronic paper, an Organic Light Emitting Diode (OLED) panel, a liquid crystal TV set, a liquid crystal display, a digital photo frame, a mobile phone or a tablet computer, etc.

Apparently, various modifications and variations may be made by one skilled in the art without departing from the spirit and scope of the present invention. Thus, if these modifications and variations of the present invention fall into the scope of the claims of the present invention and their equivalents, the present invention tends to encompass these modifications and variations.

What is claimed is:

1. An array substrate in a liquid crystal display, comprising:
a planarization layer covered on the array substrate, the planarization layer forming a planar plane on the array substrate and an orientation film being uniformly dispersed on the planarization layer,
wherein:
the planarization layer is in a shape of a frame, and the planarization layer in the shape of the frame is set on and extends to a non-display area of the array substrate, inner dimensions of the frame of the planarization layer are the same as dimensions of a display area of the array substrate,
a via hole is formed in the non-display area of the array substrate and covered by the planarization layer,
the orientation film is formed uniformly on the planarization layer by an orientation solution,
the planarization layer is a resin layer,
the resin layer comprises black resin,
the resin layer comprises a dipentaerythritol pentaacrylate/dipentaerythritol hexaacrylate, and
a thickness of the planarization layer is not less than 0.9 μm and in a position where the via hole is formed not less than a depth of the via hole.

2. The array substrate according to claim 1, wherein the thickness of the planarization layer is between 0.9 and 1.0 μm.

3. A liquid crystal display panel, comprising the array substrate according to claim 1.

4. A liquid crystal display device, comprising the liquid crystal display panel according to claim 3.

* * * * *